United States Patent [19]

Van Oosten

[11] 3,997,255
[45] Dec. 14, 1976

[54] ARCUATE OPTICAL SCANNING FOR N-S MOVEMENT IN A MAP DISPLAY NAVIGATIONAL APPARATUS

[75] Inventor: Hendrik Van Oosten, Ottawa, Canada

[73] Assignee: Control Data Canada, Ltd., Ottawa, Canada

[22] Filed: June 19, 1975

[21] Appl. No.: 588,455

Related U.S. Application Data

[63] Continuation-in-part of Ser. No. 458,735, April 8, 1974, abandoned.

[30] Foreign Application Priority Data

June 15, 1973 Canada .............................. 174122

[52] U.S. Cl. ................................. 353/12; 353/87; 353/78
[51] Int. Cl.² ......................................... G03B 21/00
[58] Field of Search ........................... 353/5, 11–14, 353/26 R, 26 A, 27 R, 27 A, 87, 78

[56] References Cited

UNITED STATES PATENTS 2,472,098  6/1949  Duncan .............................. 353/12

3,508,821  4/1970  Ujhelyi .............................. 353/12

FOREIGN PATENTS OR APPLICATIONS 1,347,044  11/1963  France .............................. 353/27

Primary Examiner—Harry N. Haroian
Attorney, Agent, or Firm—A. J. S. Davidson; William D. Parks; H. Wayne Rock

[57] ABSTRACT

A navigational apparatus for use in a piloted craft in which a map is displayed pictorially on a screen, representative of the terrain over which the craft is passing. The apparatus employs a moving film strip, a light source and known means to focus and project an image onto the screen. The light source is adapted for arcuate movement across the width of the film synchronously with an optical scanning device placed between the film and the screen and also adapted for arcuate movement so that N-S scanning of an individual film frame may be effected. E-W scanning of the film frame is effected by advancing the film in a suitable film transport. The film transport mechanism is suitably programmed to take into account a correction factor for the arcuate displacement of the N-S scanning device.

2 Claims, 12 Drawing Figures

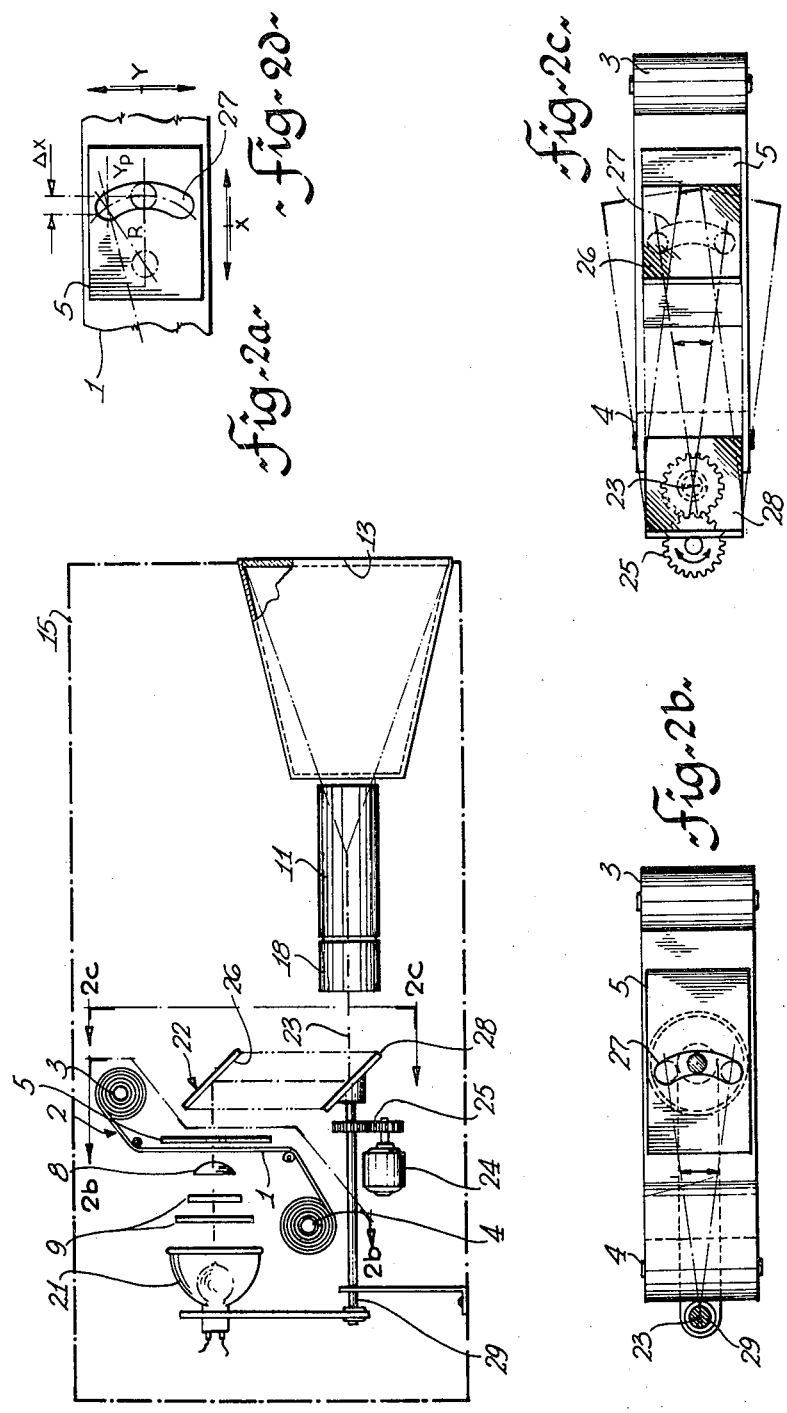

ARCUATE OPTICAL SCANNING FOR N-S MOVEMENT IN A MAP DISPLAY NAVIGATIONAL APPARATUS

This application is a continuation-in-part of U.S. application Ser. No. 458,735, filed Apr. 8, 1974, now abandoned.

This application relates to improved navigational apparatus, and in particular it relates to improved navigational apparatus having a pictorial map display.

The navigational apparatus described herein is primarily intended for use in aircraft, but it will, however, be understood that the apparatus is adapted for use in any craft moving over any surface, such as the earth's surface, or in any film reading apparatus examining portions of a film and hence requiring both X and Y coordinate movement.

Navigational apparatus of the present general type which provides a form of pictorial representation of aircraft position is well known. In some instances the pictorial representation is projected onto the back surface of a special cathode ray tube also displaying other navigational information. In others the pictorial information is merely displayed upon a suitable screen. In either event the pictorial display is produced by projection of the image, usually magnified between about 10X and about 20X, of a portion of a film transparency representing a portion of a topographic map. Normally, a large number of transparencies or frames are combined in the form of a strip representing the whole map. Each frame usually represents a portion of a Lambert conical map projection, overlapping by a predetermined amount at the ends and sides the map portions represented by frames depicting adjacent map areas. The film, which in the past has conveniently, but not necessarily, been 35 mm film, is stored in a film transport or cassette system and transported back and forth between a pair of take-up reels or spools as required, to draw a desired frame or portion of a frame into position adjacent a light passing aperture, aligned with a light source on one side and the display screen on the other. A typical system is fully described in U.S. Pat. No. 3,208,336, issued Sept. 28, 1965, to R. E. Vago and assigned to the assignee of the present application.

It will be appreciated that movement of the film between the spools adequately provides longitudinal motion of the film for selection of a desired frame or portion of a frame in that direction, by convention defined as the E-W or X direction, but it does not provide transverse motion across the film for selection of a desired portion of a particular frame in that direction, by convention defined as the N-S or Y direction. N-S motion has, in the past and in the aforementioned U.S. patent, been provided by purely mechanical means, such as lateral movement of the entire film transport assembly relative to the light passing aperture and light source, in order to obtain effective scanning of a desired frame in the N-S direction.

In advanced navigational systems required for modern aircraft, increased accuracy and increased geographic coverage is often required in the map display system which cannot be provided by the conventional system. The problems are compounded by severe space and weight limitations particularly with the inclusion of a cathode ray tube for dynamic read-out of other required navigational information. It has been found that the required accuracy, increased image brightness and increased geographic coverage can best be achieved by using approximately 70 feet of 70 mm film instead of the more conventional 30 feet of 35 mm film. The problems of scanning, in the N-S direction, a 70 mm film are, however, compounded, and furthermore the size of the cassettes required is considerably increased. The increased cassette size is not only more difficult to move accurately, requiring larger motors, but also the required rigidity of the system, due to the increased weight, is difficult to achieve under the anticipated environment for the system. The convention mechanical means for effecting N-S scanning of the film are, therefore, generally unsatisfactory.

It has been proposed in copending application Ser. No. 458,736, filed Apr. 8, 1974, in the name of T. A. Hicks and assigned to the present assignee that the mechanical N-S scanning device be replaced by an optical scanning device and the aforesaid application describes several ways in which such optical scanning may be effected, using a direct translational movement of the optical scanning device, which may include fibre optics, prisms or mirrors. Problems do, however, remain with the translational optical devices of the copending application with respect to the desired accuracy of the lineal movement and, more importantly, with respect to the focal length of the scanning elements. The long focal length required effectively requires relatively large lenses in the projection system in order to collect a sufficient amount of light for the required image brightness, and hence the weight and space problem is intensified.

It is, therefore, an object of the present invention to provide an alternative optical scanning device for effecting N-S scanning of a film in a navigational map display apparatus.

It is another object of the present invention to provide an optical scanning device for effecting N-S scanning of a film in a navigational map display apparatus which employs a fixed length optical path, thereby avoiding focal length compensation and chromatic aberration problems.

It is a further object of the present invention to provide an optical scanning device for effecting N-S scanning of a film in a navigational map display apparatus which employs an arcuate movement of the scanning element and to provide a correction factor in the E-W scanner to compensate for the arcuate displacement in the N-S scan.

These and other objects will become more apparent from the following description taken in conjunction with the accompanying drawings in which:

FIG. 2(a) is a schematic side view of one embodiment of the present invention;

FIG. 2(b) is a section through FIG. 2(a) taken along line 2b—2b;

FIG. 2(c) is a section through FIG. 2(a) taken along line 2c—2c;

FIG. 2(d) is an enlarged view of the aperture shown in FIG. 2(b);

Figure 1A:
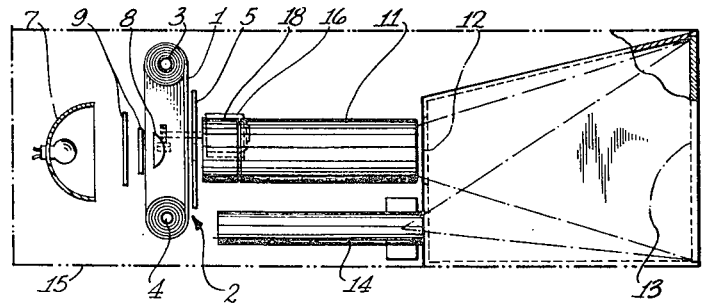
FIG. 1(a) is a schematic side view of a map display device according to the prior art.
Figure 1B:
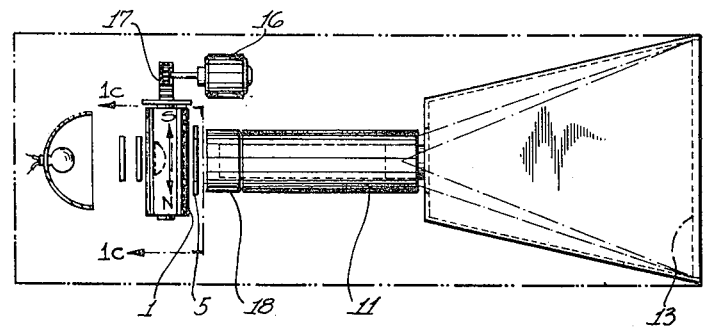
FIG. 1(b) is a schematic top view of the map device of FIG. 1(a)
Figure 1C:
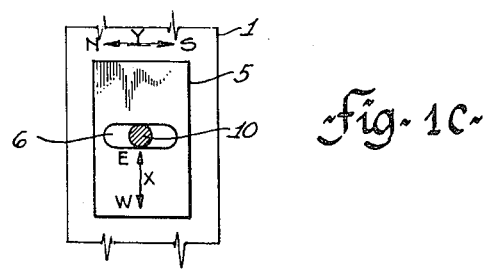
FIG. 1(c) is a section taken along 1c—1c in FIG. 1(b) showing the lateral sweep area of the cassette of the device of FIGS. 1(a) and 1(b)

In FIGS. 1(a), 1(b) and 1(c) there is shown a typical map display device of the prior art. A 35 mm film strip 1, comprising a plurality of frames representing portions of a large map, is contained in a film transport or cassette system 2, comprising take up spools 3 and 4 reversibly driven and controlled by motors (not shown) in known fashion. The film 1 is moved longitudinally between spools 3 and 4 over a plate 5 provided with a transverse light passing aperture or slit 6. A central portion of slit 6 is illuminated by means of a light projector or lamp 7, suitably provided with an optical focusing condenser system 8. Heat absorbing glasses 9 are usually provided to protect the film base of strip 1, usually gelatine, from burning by lamp 7. Light, therefore, is projected through slit 6 and illuminates the portion 10 of film 1 in line therewith. The image is then projected through a projection lens system 11, known per se, and through a special window 12 to the rear face of a special cathode ray tube screen 13. Other navigational information is generated on the screen 13 from the cathode ray tube electron gun 14. For convenience a known optical rotator 18, such as a Raunsch prism system, may be provided so that the map image projected onto the screen may be wholly or partially rotated to meet operational needs. The entire device is conveniently mounted on a frame or in box 15 in known manner. It will be appreciated that the E-W or X scanning of the film is achieved by moving the film back and forth between spools 3 and 4. N-S or Y scanning of the film is achieved by lateral displacement of the cassette system 2, by means of motor 16 on rack and pinion 17, relative to plate 5 as shown by the arrows in FIGS. 1(b) and 1(c).

As previously indicated, mechanical movement of the cassette system 2 is extremely cumbersome and difficult in the limited space available and becomes totally impractical when the much larger cassette system for the desired 70 feet of 70 mm film is considered.

In view of the difficulty of translational movement of the enlarged cassette system required in advanced map display systems, it was determined that the N-S scan should be effected optically and FIGS. 2 and 3 illustrate two alternative embodiments which have been developed to effect an arcuate optical scan in the N-S direction. E-W scanning is achieved, as before, by moving the film back and forth between the take-up spools.

FIG. 2(a) shows a side view of an apparatus embodying the present invention. A cassette system 2, a light source 21, heat glasses 9 and condenser 8 are provided as described with reference to FIG. 1. Similarly, a plate 5 having a light passing aperture 27, an optical rotator 18, lens projection system 11 and screen 13 are provided. Light from source 21 passes through film 1 and aperture 27 to the N-S arcuate optical scanner 22 and thence to optical rotator 18, projection system 11 and screen 13. Arcuate scanner 22, comprises in FIG. 2(a), a pair of front surface mirrors mounted, usually at 45°, to the film plane so as to provide a periscopic scanning effect. Alternatively, and for more accurate movement, the pair of front face mirrors may be replaced by a rhomboidal prism. The periscopic scanner 22 is mounted for arcuate movement about the axis 23 of the lens projection system 11. Arcuate movement may be provided by motor 24 and gears 25, so that mirror 26 describes an arc corresponding to the arc shaped slot 27 in plate 5, and scanning the width of film 1 as shown more clearly in FIGS. 2(b), 2(c) and 2(d). As mirror 26 moves arcuately mirror 28 moves about its own axis to maintain its front surface parallel with mirror 26 and maintain its axial position relative to the lens projection system 11. Such movement is, of course, much simplified by use of a rhomboidal prism in place of mirrors 26 and 28. Motor 24 also drives, via shaft 29, light source 21 in synchronous arcuate movement with mirror 26.

Figure 4B:
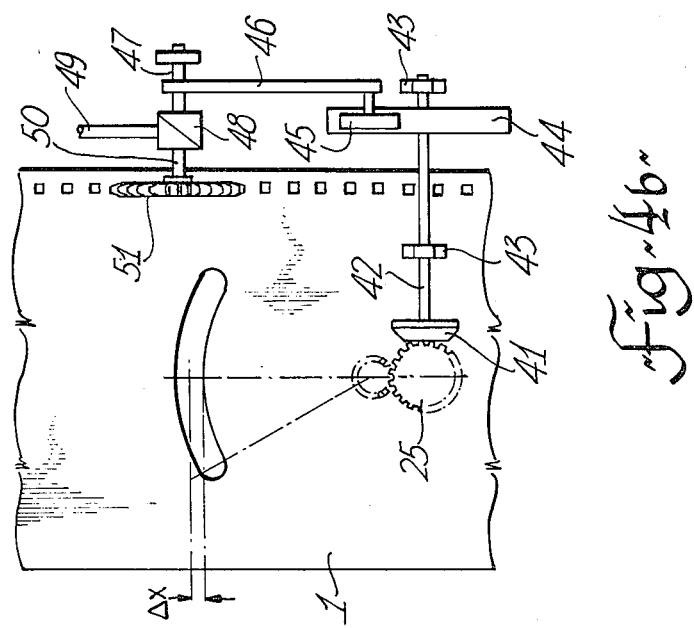
FIG. 4(b) is a schematic plan view of the embodiment shown in FIG. 4(a)
Figure 4A:
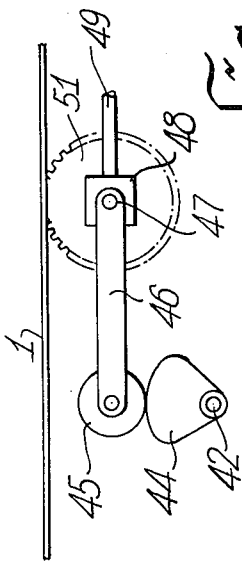
FIG. 4(a) is a schematic side view of the invention of FIG. 2(a) showing a mechanical cam means to compensate for the arcuate displacement shown in FIG. 2(d)
Figure 5:
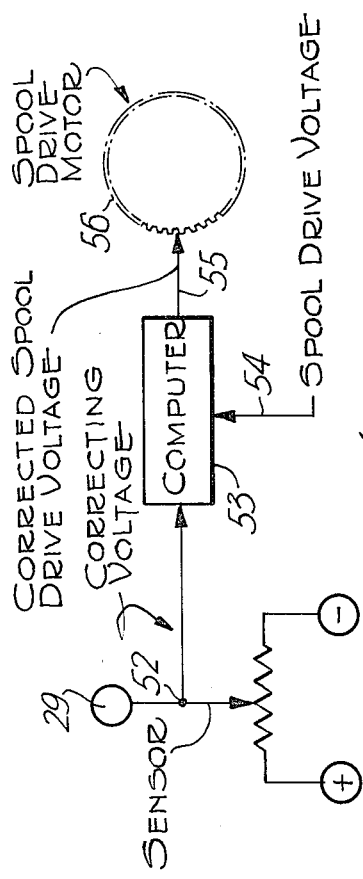
FIG. 5 is a schematic diagram illustrating a computer control means in the embodiment of the invention shown in FIG. 2(a) to compensate for the arcuate displacement shown in FIG. 2(d).

It will be appreciated, by reference particularly to FIG. 2(d), that the N-S scan thus provided is not linear with respect to the film, by reason of the arcuate displacement $\Delta x$. This displacement may be compensated by provision of a mechanical cam adjustment as shown in FIGS. 4(a) and 4(b) of the X or E-W movement, or preferably by computer compensation as shown in FIG. 5, calculated to provide a $\Delta x$ update of the X position correlated to the Y. In FIGS. 4(a) and 4(b), gear 25, operatively connected to drive motor 24 (FIGS. 2(a) and 2(c)) is provided with a wedge or similar gear 41 mounted on a shaft 42 rotatable in bearings 43. A suitably shaped cam 44 is mounted on shaft 42 for arcuate movement. A roller or cam follower 45 is mounted, for sliding contact with cam 44, on cam link 46. Cam link 46 is fixedly secured to a rotatable input shaft 47 of a mechanical adder 48, known per se, provided with a main drive input 49 which is connected to a spool drive motor (not shown) in a manner known per se. The output shaft 50 of adder 48 is connected to a drive sprocket 51 which engages sprocket holes 52 along one edge of film 1. Thus, as motor 24 drives the optical device 22 to scan arcuately across film 1, cam 44 and its follower 45 provides synchronous arcuate movement to cam link 46 and an arcuate movement to adder input shaft 47 which is superimposed upon the main sprocket drive 49 in the mechanical adder 48, thereby speeding up or slowing down advancement of the film 1 by drive sprocket 51 and compensating for the arcuate displacement $\Delta x$.

In FIG. 5 there is shown an illustration of a computer compensation for the arcuate displacement $\Delta x$. An electronic sensor 52, having a variable power source 53, is provided to sense the arcuate position of shaft 29 and to transmit a correcting signal such as a correcting voltage signal proportional to the arcuate position of shaft 29 to an onboard computer 53 programmed to include the vector resolvers described in more detail hereinbelow. A spool drive control signal 54, such as a voltage signal, is also fed into the computer and a corrected spool drive control signal 55, or voltage is transmitted from the computer to a spool drive motor 56 driving a sprocket drive, such as 51 in FIG. 4(a), or cassette motor as in FIG. 2(a), thereby continuously compensating for arcuate movement of the optical scan across film 1.

Vector resolvers may be used effectively for computer compensation and, by reference to FIG. 2(d), where $V_x$ and $V_y$ are the vector resolvers for Y position pick-off and the inputs from a central computer are $Y_c$ and $X_c$, $$\text{the } Y \text{ servo error} = Y_c - Y_p = Y_c - R_x \frac{V_y}{\sqrt{V_y^2 + V_x^2}}$$

and $$\text{the } X \text{ command position} = X_c - \Delta x = X_c - R + R_x \frac{V_x}{\sqrt{V_y^2 + V_x^2}}$$

Figure 3B:
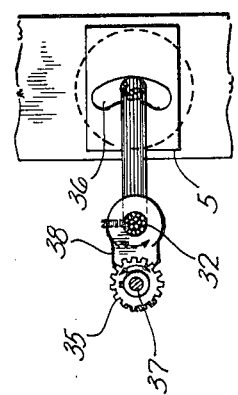
FIG. 3(b) is a section through FIG. 3(a) taken along the line 3b—3b.
Figure 3A:
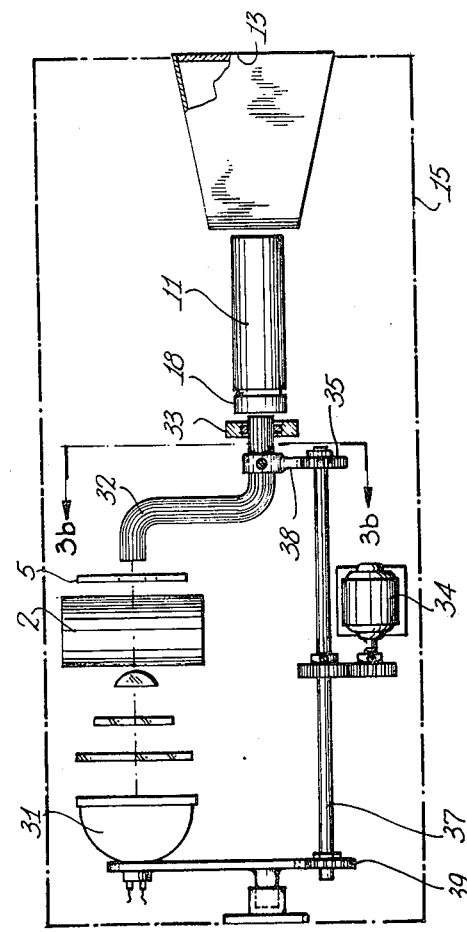
FIG. 3(a) is a schematic side view of an alternative embodiment of the present invention.

FIGS. 3(a) and 3(b) show an alternative embodiment of the present invention wherein the periscopic mirrors or rhomboidal prism are replaced by a bundle of optic fibres 32, suitably mounted in a bearing 33 for arcuate movement and scanning of slot 36, in the same manner as hereinbefore described. Arcuate movement is provided by motor 34 and gear 35 on shaft 37 acting upon a cam 38. Motor 34 also provides synchronous arcuate movement of lamp 31 mounted on the same axis of rotation as bundle 32, via shaft 37 and gear 39. A bundle of optic fibres has the advantage that the length of the light path is effectively reduced to zero, but it suffers from the disadvantage that commercially available optic fibres are only of the order of 0.001 inch in diameter whereas for the high resolutions desired in large-sized equipment, optical requirements call for individual fibres of the order of 0.0004 inch diameter. Some resolution is therefore lost using the fibre optic technique.

The fibre optic periscopic bundle provides a nonlinear scan as described with reference to FIG. 2(a) and this may be compensated in precisely the same manner as hereinbefore described.

Many other modifications and alternative means of effecting the essential arcuate scanning in the N-S direction will be apparent to those skilled in the art, without departing from the scope of the present invention as claimed in the appended claims.

I claim:

1. A navigational apparatus for use in a piloted craft comprising:
   a frame;
   a light projector, mounted for arcuate movement thereof, at one end of said frame and a display screen mounted at the other end of said frame defining a light path therebetween;
   a drive sprocket mounted on said frame to move a film across said light path in a film plane perpendicular to light from said projector;
   a plate positioned adjacent said film defining a light passing arcuate aperture in said light path, said plate being fixedly mounted on said frame in a plane adjacent and parallel said film plane;
   optical scanning means mounted on said frame on the opposite side of said plate from the light projector for arcuate movement therewith and mechanically linked thereto for synchronous parallel arcuate movement in a plane parallel to said film plane to thereby arcuately scan across said film;
   cam means mechanically linked to said optical scanning means and responsive to displacement thereof to alter the position of said drive sprocket and compensate for arcuate displacement in said scanning means, thereby providing a linear scan longitudinally and transversely in said film plane; and
   focusing means between said scanning means and said display screen to focus a film image on said screen.

2. A navigational apparatus for use in a piloted craft comprising:
   a frame;
   a light projector, mounted for arcuate movement thereof, at one end of said frame and a display screen mounted at the other end of said frame defining a light path therebetween;
   a film transport means mounted on said frame to move a film across said light path in a film plane perpendicular to light from said projector;
   a plate positioned adjacent said film defining a light passing arcuate aperture in said light path, said plate being fixedly mounted on said frame in a plane adjacent and parallel said film plane;
   optical scanning means mounted on said frame on the opposite side of said plate from the light projector for arcuate movement therewith and mechanically linked thereto for synchronous parallel arcuate movement thereof in a plane parallel to said film plane to thereby arcuately scan across said film;
   control means interconnected between said film transport means and said optical scanning means to compensate for arcuate displacement in said scanning means, thereby providing a linear scan longitudinally and transversely in said film plane;
   said control means including a compensation circuit to provide a $\Delta x$ update of an X position corresponding to movement longitudinally in said film plane, correlated to a Y position corresponding to movement transversely in said film plane, wherein $$Y \text{ servo error} = Y_c - Y_p = Y_c - R_x \frac{V_y}{\sqrt{V_y^2 + V_x^2}}$$

and $$\text{an } X \text{ command position} = X_c - \Delta x = X_c - R + R_x \frac{V_x}{\sqrt{V_y^2 + V_x^2}}$$

where $\Delta x$ is the arcuate displacement, R is the radius of the arc, $V_x$ and $V_y$ are vector resolvers for Y position, and $Y_c$ and $X_c$ are computer inputs; and
   focussing means between said scanning means and said display screen to focus a film image on said screen.

* * * * *